United States Patent [19]

Soffer et al.

[11] Patent Number: 5,649,996
[45] Date of Patent: Jul. 22, 1997

[54] METHOD FOR THE SEPARATION OF GASES AT LOW TEMPERATURES

[75] Inventors: Abraham Soffer, Arad; Jack Gilron, Beer-Sheva; Refael Hed-Ofek, Dimona; Moshe Hassid, Beer-Sheva, all of Israel

[73] Assignee: Carbon Membranes, Ltd., Arava, Israel

[21] Appl. No.: 546,618

[22] Filed: Oct. 23, 1995

Related U.S. Application Data

[63] Continuation of Ser. No. 229,948, Apr. 19, 1994, abandoned.

[30] Foreign Application Priority Data

Apr. 19, 1993 [IL] Israel ............................. 105442

[51] Int. Cl.[6] ............................................. B01D 53/22
[52] U.S. Cl. ............................. 95/54; 95/45; 62/655
[58] Field of Search .......................... 62/9, 11, 20, 22, 62/26, 51.1 R; 95/45, 47, 54; 96/4, 7–11

[56] References Cited

U.S. PATENT DOCUMENTS

| | | | |
|---|---|---|---|
| 2,650,670 | 9/1953 | Cichelli | 96/4 X |
| 2,924,630 | 2/1960 | Fleck et al. | 95/45 X |
| 3,149,775 | 9/1964 | Pagano | 96/8 X |
| 3,511,031 | 5/1970 | Ketteringham et al. | 96/8 |
| 4,398,926 | 8/1983 | Doshi | 95/55 |
| 4,595,405 | 6/1986 | Agrawal et al. | 62/18 |
| 4,681,612 | 7/1987 | O'Brien et al. | 62/23 |
| 4,685,940 | 8/1987 | Soffer et al. | 96/8 |
| 4,841,732 | 6/1989 | Sarcia | 96/8 X |
| 4,881,953 | 11/1989 | Prasad et al. | 95/54 X |
| 5,069,794 | 12/1991 | Haag et al. | 95/54 X |
| 5,104,425 | 4/1992 | Rao et al. | 95/47 |
| 5,127,925 | 7/1992 | Kulprathipanja et al. | 95/54 |
| 5,162,301 | 11/1992 | Reich et al. | 95/47 X |
| 5,342,431 | 8/1994 | Anderson et al. | 95/45 |

FOREIGN PATENT DOCUMENTS

| | | | |
|---|---|---|---|
| 0362898 | 4/1990 | European Pat. Off. | |
| 0410845 | 1/1991 | European Pat. Off. | |
| 0428052 | 5/1991 | European Pat. Off. | |
| 0460512 | 12/1991 | European Pat. Off. | |
| 51-005499 | 1/1976 | Japan | 95/45 |
| 2-307805 | 12/1990 | Japan | 96/4 |
| 2207666 | 2/1989 | United Kingdom. | |
| WO92/13628 | 8/1992 | WIPO. | |

*Primary Examiner*—Robert Spitzer
*Attorney, Agent, or Firm*—Merchant, Gould, Smith, Edell, Welter & Schmidt, P.A.

[57] ABSTRACT

A method for separating gases with enhanced selectivity comprises causing a mixture of gases to be separated to flow through a molecular sieving membrane (MSM), at cryogenic temperatures.

9 Claims, 5 Drawing Sheets

METHOD FOR THE SEPARATION OF GASES AT LOW TEMPERATURES

This is a File Wrapper continuation application of application Ser. No. 08/229,948, filed Apr. 19, 1994, now abandoned.

FIELD OF THE INVENTION

The present invention relates to the separation of gases at low temperatures. More particularly, the invention relates to the use of carbon molecular sieve membranes for the separation of gases at temperatures approaching those at which gases liquefy.

BACKGROUND OF THE INVENTION

Carbon molecular sieve membranes are an example of microporous membranes (pore size less than 20 Angstroms), which separate gas molecules on the basis of their different diameters (molecular sieving). The mechanism for such membrane transport is based on a combination of adsorption within and activated diffusion along the pore length. Studies of gas permeation through microporous membranes show selectivities much greater than would be expected from Knudsen diffusion—the predominant bulk process in micropores. Therefore, the process can be seen to occur predominantly through hopping between adsorption sites. The permeation rate will be proportional to the product of the local gradient of the concentration of gas molecules adsorbed on the pore and the effective diffusion coefficient (D) at that point in the pore.

The temperature dependence of the permeability in membranes will depend on the temperature dependence of the activated diffusion coefficient D, and that of the extent of adsorption. While adsorption isotherms show that the extent of adsorption for most gases on most materials will increase with a drop in temperature, the activated diffusion coefficient often drops much more drastically, leading to a net drop in permeability with the drop in temperature. This is particularly the case for glassy polymers where the process for activated transport involves some movement of polymer segments to allow movement of gas molecules through interconnected free volumes. Even though some polymer membranes are known to show an increase in selectivity with decrease in temperatures, they suffer a disastrous loss of permeability even for the faster member of a gas pair as the membrane approaches the temperature where all polymer motion is frozen out. Such polymer membranes are therefore of limited applications at low temperatures. This is illustrated by FIG. 1 which shows that for polytrimethylsilyl propyne (PTMSP), one of the more state of the art membranes, the permeability drops drastically below $-20°$ C.

THE PRIOR ART

The art has provided a number of solutions for the separation of difficultly separable gases, which are expensive and complicated to build and to operate. One representative example of such a process is the separation of close boiling gases, such as oxygen from argon, to produce pure argon. According to the known art this is done with the use of cyrogenic distillation columns in which the energy efficiency is very low because of the closeness of the boiling points of oxygen and argon ($\Delta T_{Bp} = 3°$ K) requiring a high reflux ratio. While a prior art membrane or adsorption process could be theoretically considered as an alternative, this would be enormously inefficient energetically, because according to known processes it is required to heat the gas mixture to near ambient to effect the separation and then to cool again to reliquefy the products. U.S. Pat. No. 4,398,926 teaches the separation of hydrogen from a high-pressure stream, using a permeable membrane. U.S. Pat. No. 4,681,612 deals with the separation of landfill gas, and provides for the removal of impurities and carbon dioxide in a cryogenic column. Methane is then separated by a membrane process. The temperature in the membrane is $80°$ F. U.S. Pat. No. 4,595,405, again, combines a cryogenic separation unit and a membrane separation unit. The membrane unit is operated with gas at or near ambient temperature.

SUMMARY OF THE INVENTION

It has now been surprisingly found, and this is an object of the present invention, that contrary to the expectation that lowering of the temperature will lead to loss of permeability, as is known in the art with a number of membranes, working at subambient temperatures with molecular sieve membranes (MSM) leads to tremendous increases in selectivity with little or no loss in permeability. This fact opens the door to a number of novel applications of these membranes, as will be more fully detailed hereinafter.

Accordingly, it is an object to the present invention to provide an efficient process, utilizing molecular sieve membranes, by means of which such separations can be carried out at low temperatures.

It is another object of the invention to provide membranes which can be used for such low-temperature separations.

Without wishing to be bound by any particular theory, the inventors believe that the reason for this unexpected behavior resides in the structure of the molecular sieve membrane and in the different transport mechanism therein as compared, e.g., with glassy polymer membranes.

The molecular sieve membrane can be of any suitable type, e.g., carbon molecular sieve membranes (MSM) or glass molecular sieve membranes (GMSM). For the sake of brevity, reference will be made hereinafter mostly to CMSM as the representative membrane, it being understood that the same description applies, mutatis mutandis, to other molecular sieve membranes as well.

Other objectives and advantages of the invention will become apparent as the description proceeds.

The invention also encompasses the use of microporous molecular sieving membranes to separate between gaseous molecules of different diameter at sub-ambient temperatures, resulting in much greater selectivities than can be achieved at ambient temperature. Because molecular sieve membranes such as GMSM and CMSM can operate at or near the temperatures of air liquefaction, they will be referred to hereinafter as a "cryomembrane".

DETAILED DESCRIPTION OF THE INVENTION

A setup for operating according to one embodiment of the invention is illustrated in FIG. 2. Of course, this setup is provided only by way of example and is not intended to limit the invention in any way. In particular, one could devise different module geometry and different ways of maintaining the low temperature conditions of the module, other than those shown in the present example. For example, modular devices of various geometries (e.g., hollow fiber, plate and frame, spiral wound) can be used, placed inside a commercial cryogenic cold box with local heat exchanger and heater networks to maintain a local temperature within the module.

Figure 2A:
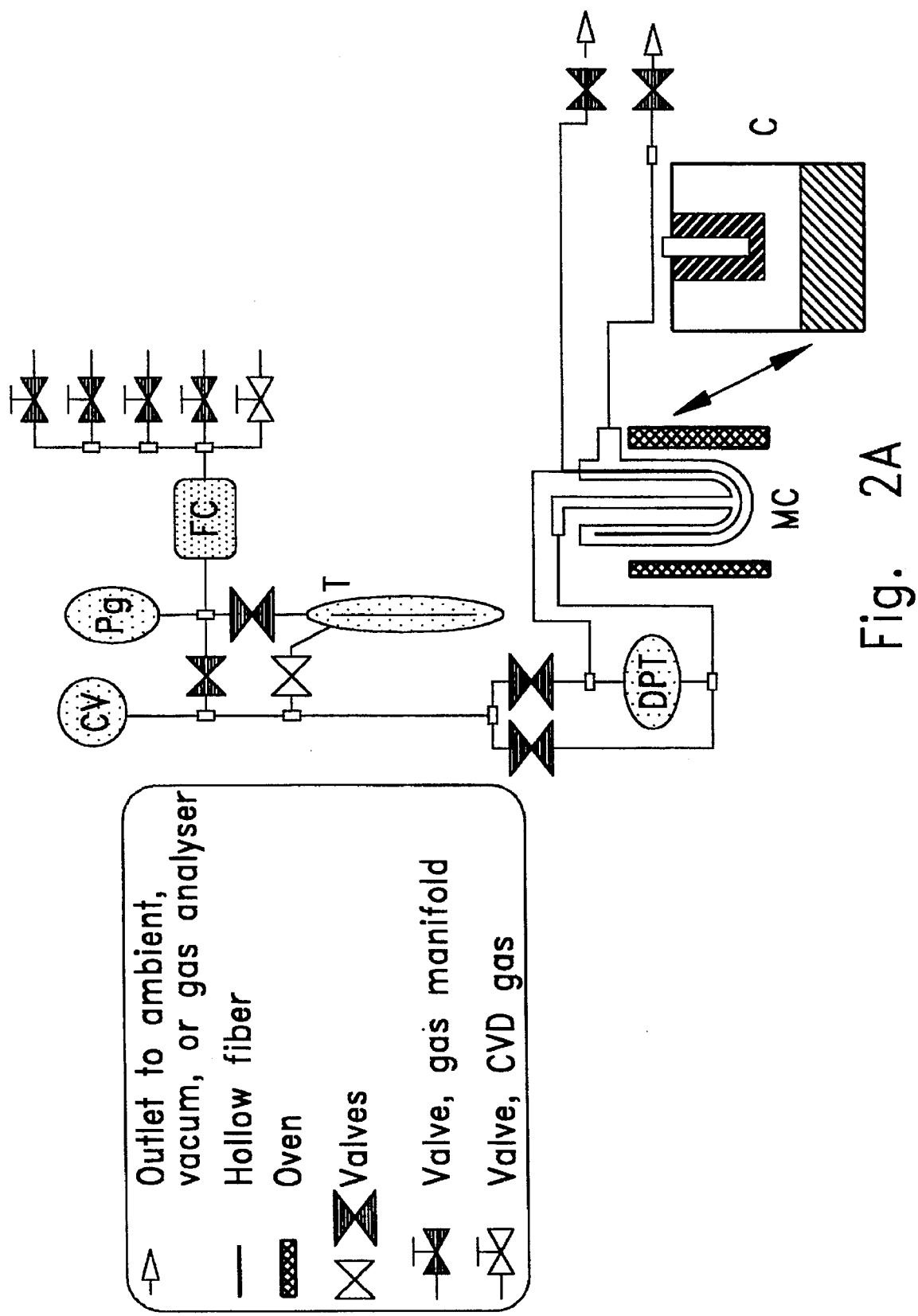
FIG. 2A: Experimental activation and permeability test system.

Referring now to FIG. 2A, the following elements are shown:

T—Trap for liquid chemical vapor deposition material carried by a gas;
CV—Calibrated volume;
FC—Flow controller;
FM—Flow meter;
DPT—Differential pressure transducer;
Pg—Pressure gauge;
Pr—Pressure regulator
BPR—Back pressure regulator;
C—Cryostat;
MC—Membrane cell.

The membrane cell (M) is placed inside an oven during manufacture, or in a cryostat (C) during low temperature permeability measurements. The gases used for tailoring the pore size and for subsequent permeation measurements are fed from a manifold on which a flow controller (FC) and pressure gauge allow metering of the absolute amounts fed to the membrane cell. If the material used for chemical deposition of vapor (CVD) on the membrane is a liquid, its vapor is picked up from a liquid trap (T) through which a carrier gas (usually $N_2$) is bubbled. The permeability of the membrane is measured by monitoring the change with time in the feed-side pressure volume product (dPV/dt) as given by the pressure gauge (Pg) and the calibrated volume (CV), while simultaneously monitoring the transmembrane pressure drop with the transducer DPT.

Figure 2B:
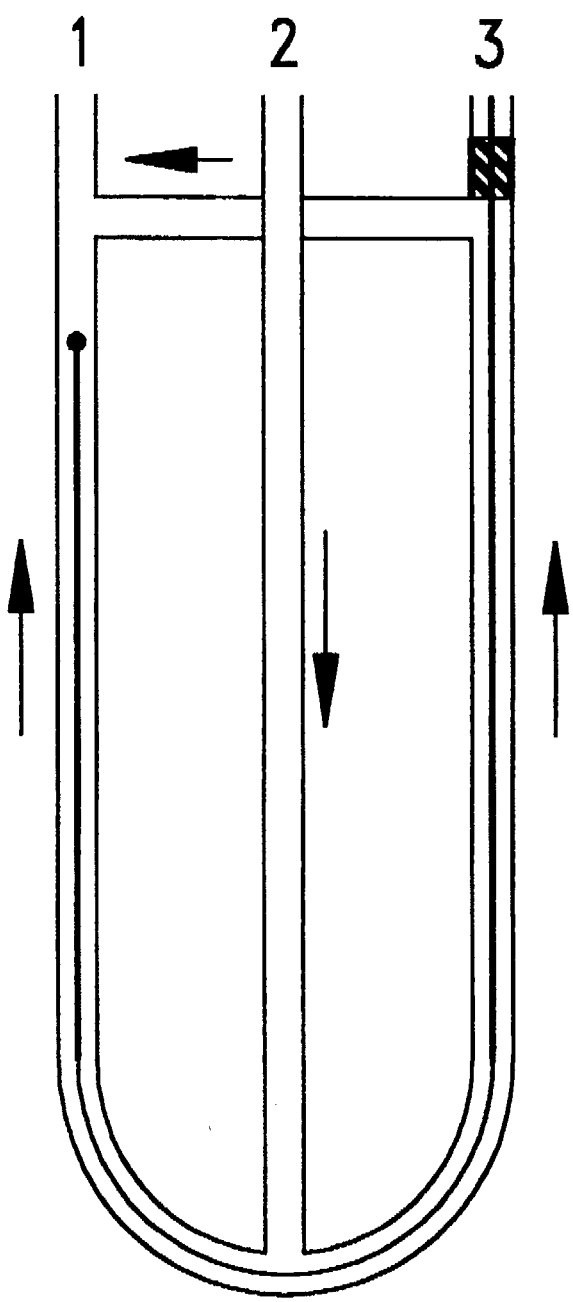
FIG. 2B: Sketch of the cryomembrane module used for obtaining measurements of the performance of the CMSM membrane.

In FIG. 2B the gas flow within the membrane cell is illustrated. Numeral 1 indicated the shell entrance, numeral 2 the shell exit, and numeral 3 the bore entrance/exit.

Figure 2C:
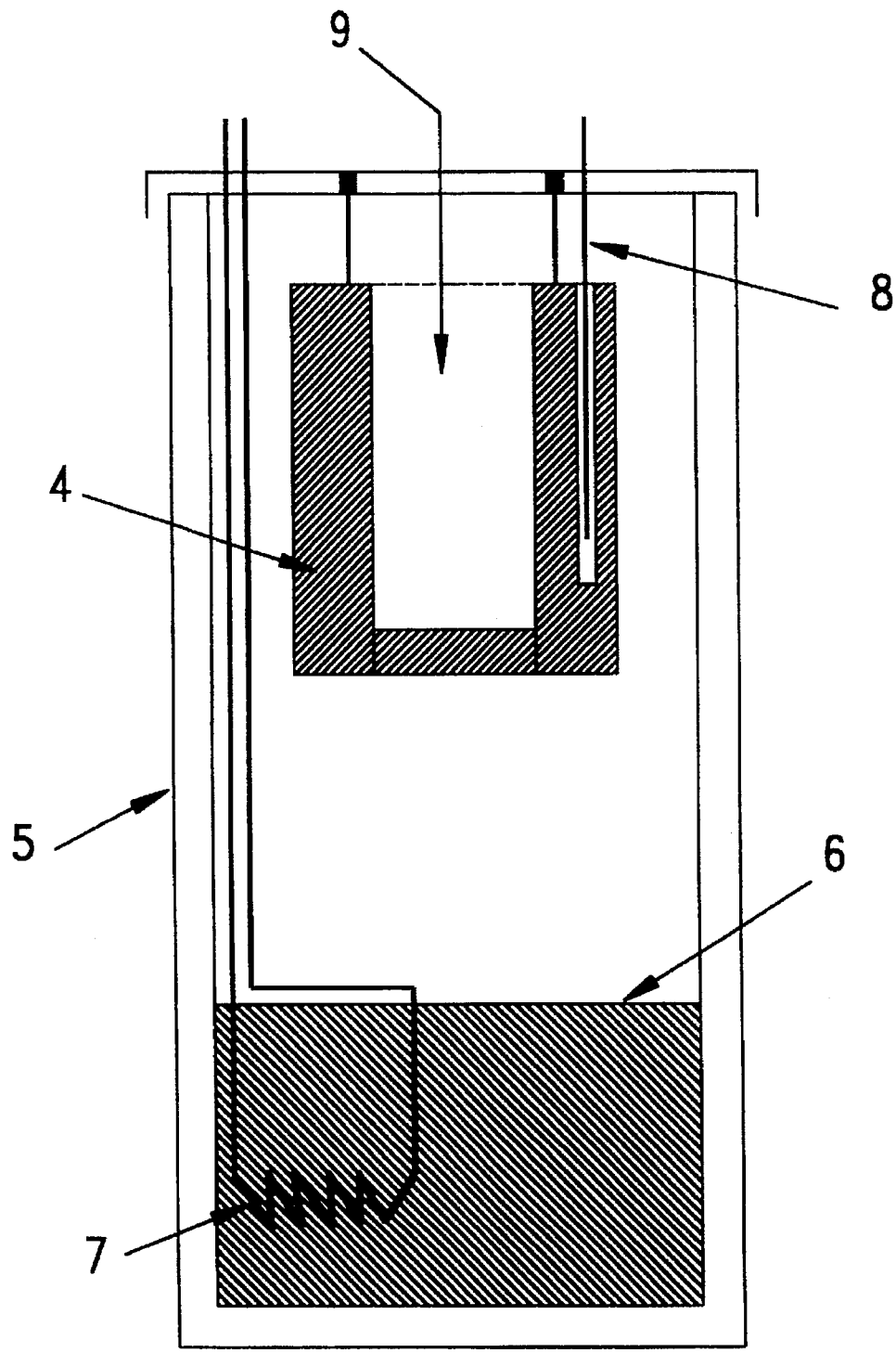
FIG. 2C: Cryostat for maintaining the module temperature.

FIG. 2C shows a cryostat which can be used in the system of FIG. 2A, which is described in detail below, with reference to Example 1.

In the examples given below the membrane module was made by potting hollow fiber carbon molecular sieve membranes in a U-shaped glass tube. The module has connections for introducing a feed gas, and removing separate a reject streams (nonpermeate) and permeate streams.

The membranes were prepared according to the methods described in U.S. Pat. No. 4,685,940 and GB 2,207,666. This membrane preparation involved the following steps:
1. Carbonization of a precursor hollow fiber
2. Activation of the fiber with oxygen at 100°–400° C.
3. Removal of excess adsorbed oxygen with hydrogen at T>500° C.
4. Chemical vapor deposition (CVD)
5. Several further steps of activation followed by inert gas or hydrogen treatment and/or CVD.

Details of the manufacturing process are given in the examples below, and with reference to the tables. Unless otherwise indicated, the membrane referred to below was prepared according to the CVD and activation steps detailed in Table 1.

Such membranes can be made to provide permeabilities greater than 100 $L/(M^2H-atm)$ and selectivities greater than 4.0 at room temperature conditions. It is found that such room temperature selectivities are large enough to generate enhanced selectivities at subzero temperatures. Thus, in one embodiment of the invention, the method comprises producing a CMSM having a permeability greater than 100 $L/M^2H$-atm and a selectivity greater than 4.0 at room temperature, and then cooling the CMSM to cryogenic temperatures and separating a mixture of gases therewith.

The gas mixture may be fed from the shell or bore side. If the gas mixture is fed in the shell side, a preferred method is to feed it down the center tube, where impurities can be precondensed in a packed bed contained in the center tube, and the feed gas splits and feeds both arms of the U tube simultaneously. The reject is recombined in a reject manifold and led away from the module.

Figure 1:
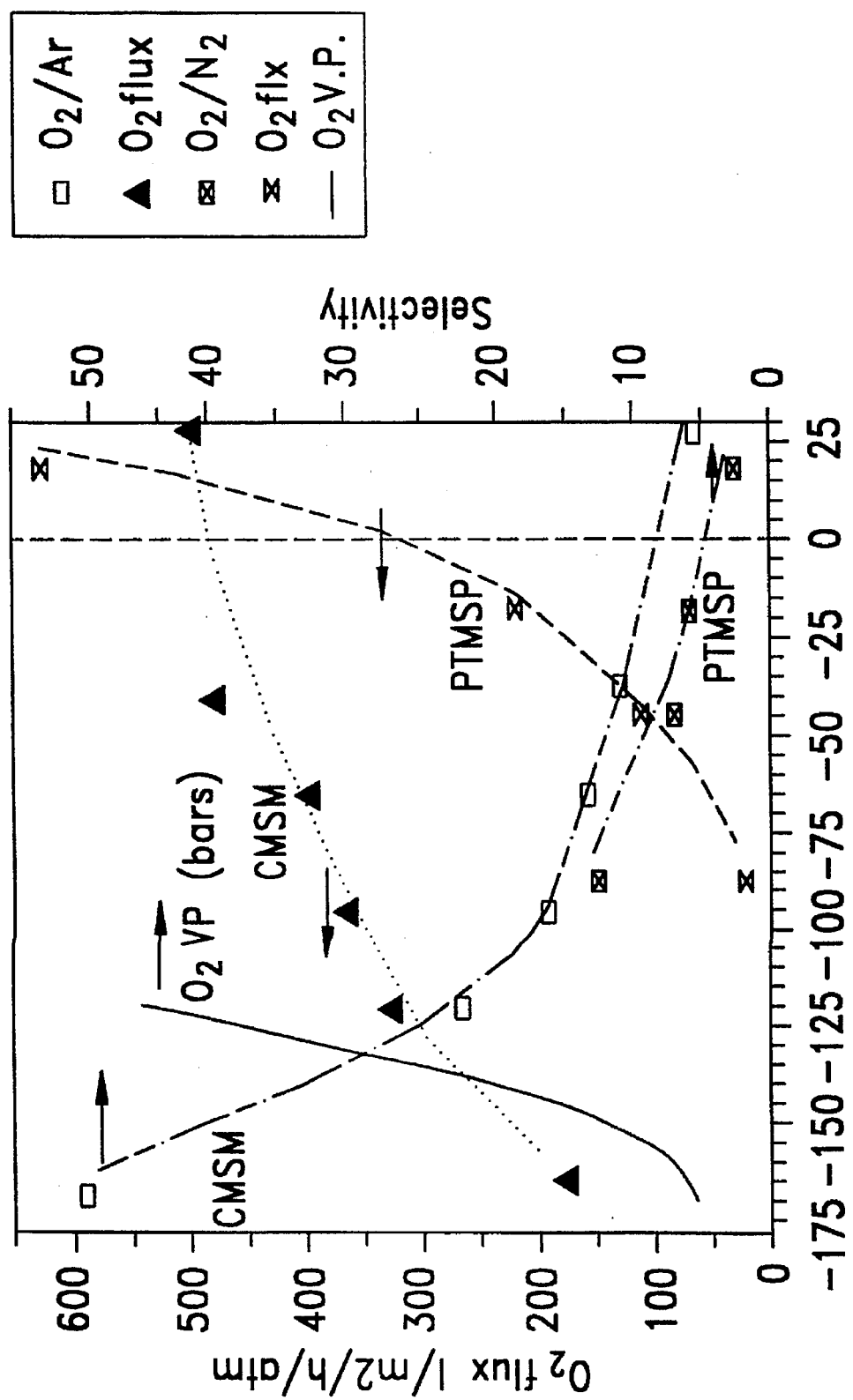
FIG. 1: The $O_2/N_2$ perm-selectivity curve for polytrimethylsilyl propyne (PTMSP) using $O_2$ and $N_2$ as the gas pair vs. $O_2/Ar$ for CMSM microporous membrane (referred to in the examples)

The module can be cooled by placing it in any controlled subzero environment, such as a commercial cold box. The pressure difference to drive the permeation process can be applied by providing a pressurized feed while the permeate is kept at ambient pressures. Alternatively, the gas can be provided at ambient pressures while drawing a vacuum or using a sweep gas on the permeate side. Or any combination of these methods of effecting a pressure difference between the two sides of the membrane can be used. One particular embodiment would be to use as feed the vapor in equilibrium with a low-boiling gas such as oxygen, or an oxygen/argon mixture, such that at the temperature of operation, the vapor pressure of the low-boiling gas would be very high. For example, FIG. 1 illustrates how the vapor pressure of oxygen varies with temperature. In such an instance the permeate could be maintained at a high enough pressure to allow recompression and liquefaction of the permeate with a moderate outlay of energy, if the permeate stream were of value.

All the above and other characteristics and advantages of the invention will be better understood through the following illustrative and non-limitative description of examples relative to preferred embodiments.

EXAMPLE 1

Preparation of the Module with Greatly Enhanced Selectivity at Subzero Temperatures A module was prepared by taking hollow carbon membrane potted in a U-shaped glass housing, as shown in FIG. 2B. It was placed in an apparatus (FIG. 2A) for measuring permeability in which activation steps could be effected, as described in GB 2,207,666 and summarized in Table 1. The permeabilities were measured on the same apparatus with the gases fed on the shell side of the membrane through the center of the U tube. A plug of quartz wool was inserted in the center tube to serve as a prefilter on which to adsorb the impurities.

This module was enclosed in a cryostat designed to maintain the module at constant temperatures ranging from 77° K to RT. The cryostat is illustrated in FIG. 2C. The cryostat consists of a metal block, 4, suspended in a Dewar flask 5 in which liquid nitrogen 6 has been introduced to a level near but not touching the bottom surface of the metal block. A heater 7 is immersed in the liquid nitrogen for the purpose of boiling nitrogen to generate a cold nitrogen vapor which can rise and cool the metal block. A heating element is wrapped around the metal block to allow local heating of the block for purposes of moderating the cooling effects of the nitrogen vapor or for quickly moving to a new operating temperature higher than the previous one. A thermocouple 8 is inserted into a hole in the block and its signal is fed as the input into a temperature controller. The temperature controller controls the current to the cooling heater to maintain a particular setpoint. This arrangement allows operation of the membrane at temperatures between ambient and the boiling point of nitrogen (77° K). In addition, an arrangement is made for adsorbing low vapor pressure impurities in the feed gas (e.g., water vapor and $CO_2$), prior to introducing the feed gas into the membrane itself.

The membrane was inserted into a slot 9 in the center of the metal block of the cryostat and its temperature systematically was varied between ambient and −176° C. The results are plotted in FIG. 1, where the permeability is shown on the left axis and the selectivity is shown on the right axis. For the sake of comparison the permselectivity of the PTMSP membrane is plotted on the same axis as a function of the temperature. The retention of the permeability at low temperatures for the CMSM membrane as compared to the PTMSP membrane is striking.

EXAMPLE 2

Membrane of Intermediate Pore Size with Enhanced Permeability at Subzero Temperatures A membrane was prepared as described in Example 1 but with a somewhat different schedule of activation and CVD, as detailed in Table 2. The gas feed was fed into the center tube where impurities were adsorbed as the gas cooled, at the bottom the gas flow split to travel up to two legs of the U tube and was conducted away through a reject manifold at the exit of the U tube at the top.

On measuring the permeabilities of the membrane to pure oxygen and nitrogen at room temperature, the membrane was found to have a permeability to oxygen of $P_{o2}$=270, and a selectivity $\alpha(=P_{o2}/P_{N2})$=3.6.

Figure 3:
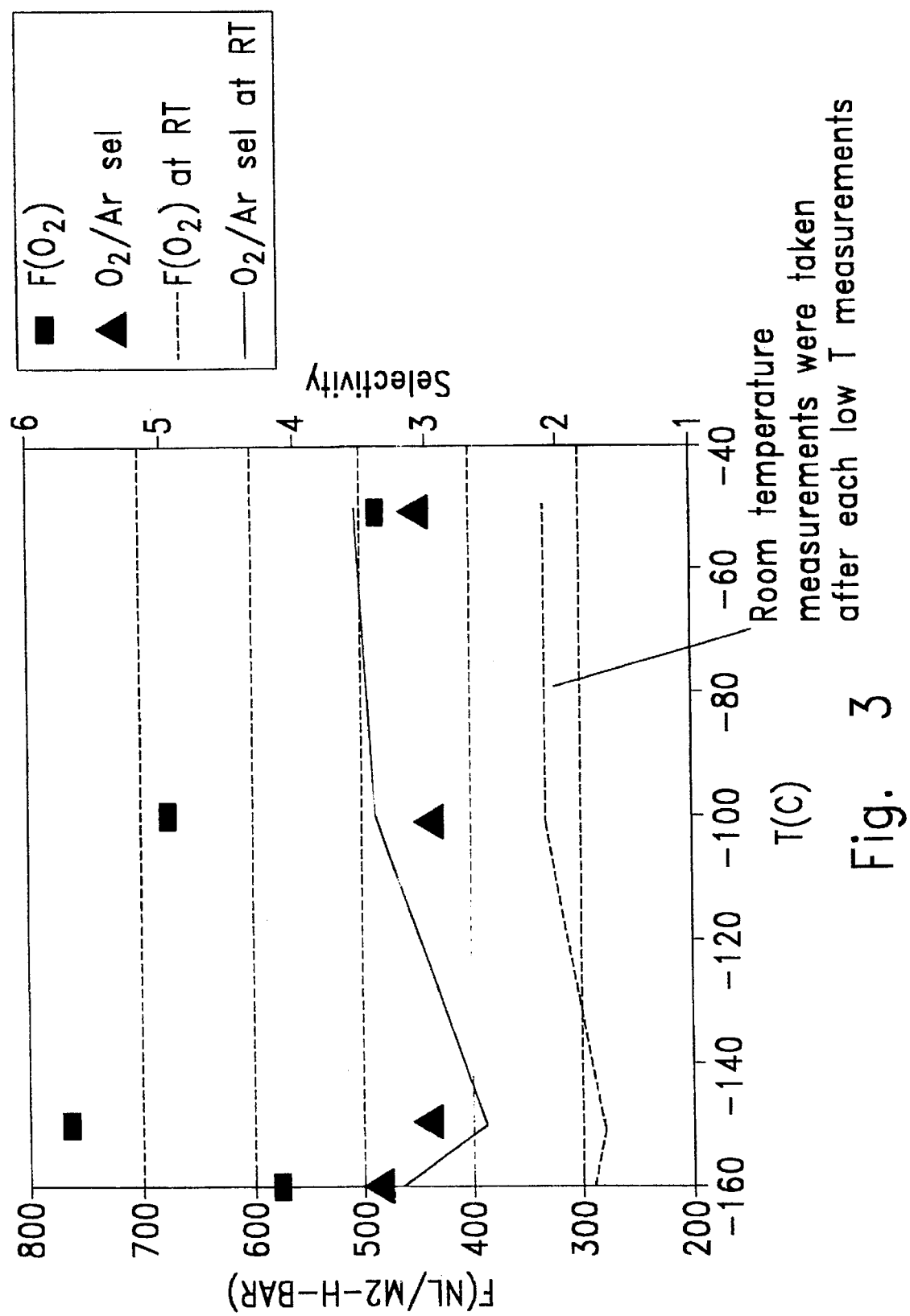
FIG. 3: Permeability and $O_2/Ar$ selectivity of CMSM cryomembrane as a function of temperature. An open membrane with $\alpha(O_2/N_2)=3$.

The permeability and selectivity was then measured over a range of temperatures down to −170° C. The results are given in FIG. 3. As can be seen, the oxygen permeability actually increases with the temperature drop, contrary to what would have been expected by the man of the art. At a certain temperature, this permeability goes through a maximum as the temperature effect on the activated transport coefficient finally begins to outstrip the effect of increased adsorption at low temperatures.

As will be apparent to the skilled person, the invention leads to unexpected results, enabling substantially improved separation results, in a manner which was not possible according to prior art methods and devices. Many modifications can of course be made in the various membranes, devices utilizing them and processes which incorporate the devices, and many different separation processes can be carried out, using different gases, all without exceeding the scope of the invention.

TABLE I

| Step # | Description | Time (minutes) | Temperature (°C.) | P (In Torr) |
|---|---|---|---|---|
| 1 | Activation | 45 | 280 | 1216 |
| 2 | CVD | 5 | 700 | 720 |
| 3 | Activation | 20 | 280 | 760 |
| 4 | Activation | 30 | 280 | 760 |
| 5 | Activation | 20 | 250 | 760 |
| 6 | Activation | 30 | 280 | 760 |
| 7 | Activation | 30 | 250 | 760 |

TABLE I-continued

| Step # | Description | Time (minutes) | Temperature (°C.) | P (In Torr) |
|---|---|---|---|---|
| F (02) final: | | | 370 L/M2-H-ATM | |
| α (02/Ar) | | | 5.6 | |
| 8 Regeneration (H2) | | 15 | 620 | 760 |
| F (02) Final | | | 494 L/M2-H-ATM | |
| α (02/Ar) | | | 5.6 | |

TABLE II

| Step # | Type | Temperature (°C.) | Time (minutes) | Gas P (In Torr) |
|---|---|---|---|---|
| 1 | Activation | 250 | 30 | 800 |
| 2 | CVD | 700 | 5 | 800 |
| 3 | Activation | 265 | 60 | 800 |
| 4 | Activation | 265 | 60 | 800 |
| 5 | Activation | 250 | 20 | 800 |
| 6 | CVD | 700 | 5 | 400 |
| 7 | CVD | 710 | 5 | 800 |
| 8 | Activation | 270 | 54 | 800 |
| 9 | Activation | 260 | 25 | 800 |
| 10 | Activation | 280 | 20 | 800 |
| 11 | Activation | 280 | 15 | 800 |
| 12 | Activation | 280 | 25 | 800 |
| 13 | Activation | 280 | 30 | 800 |
| 14 | Activation | 250 | 15 | 800 |
| F (02) final: | | 276 L/M2-HR-ATM | | |
| α (02/Ar): | | 3.1 | | |

I claim:

1. A method for separating a mixture of gases, comprising:

providing a molecular sieving membrane having a pre-existing gas selectivity, the pre-existing gas selectivity of the membrane being temperature-dependent;

cooling the molecular sieving membrane and a mixture of gases containing a gas to be separated therefrom, to a temperature of −20° C. or below, thereby gradually increasing the selectivity of the molecular sieving membrane;

separating said gas from said mixture of gases by flowing the mixture of gases through the cooled molecular sieving membrane; and wherein said molecular sieving membrane is a carbon molecular sieve membrane.

2. A method according to claim 1, wherein the temperature is equal to or higher than a higher capillary condensation temperature of one of the gases in the mixture.

3. A method according to claim 1, wherein the gases to be separated are oxygen and argon.

4. A method according to claim 1, wherein the gases to be separated are oxygen and nitrogen.

5. A method according to claim 1, wherein the gases are kept above but near their boiling points thereby minimizing a refrigeration duty needed to reliquify purified gases.

6. A method according to claim 1, wherein molecular sieving membrane is used for separating gases having close boiling points.

7. A method according to claim 6, wherein difference in boiling point temperatures is less than 5° C.

8. A method according to claim 1, wherein the step of separating the gas from the mixture of gases comprises a step of separating the mixture of gases on a basis of different diameters of gases.

9. A method for separating a mixture of gases, comprising:

provinding a molecular sieving membrane having a pre-existing gas selectivity, the pre-existing gas selectivity of the membrane being temperature-dependent;

cooling the molecular sieving membrane and a mixture of gases containing a gas to be separated therefrom, to a temperature of −20° C. or below, thereby gradually increasing the selectivity of the molecular sieving membrane;

separating said gas from said mixture of gases by flowing the mixture of gases through the cooled molecular sieving membrane; and wherein said molecular sieving membrane is a glass molecular sieve membrane.

* * * * *

UNITED STATES PATENT AND TRADEMARK OFFICE
CERTIFICATE OF CORRECTION

PATENT NO. : 5,649,996

DATED : July 22, 1997

INVENTOR(S) : Soffer et al.

It is certified that error appears in the above-identified patent and that said Letters Patent is hereby corrected as shown below:

In column 2, line 35: "(MSM)" should read --(CMSM)--.

Signed and Sealed this

Tenth Day of March, 1998

*Attest:*

BRUCE LEHMAN

*Attesting Officer*   *Commissioner of Patents and Trademarks*